Feb. 16, 1926.
H. E. CURTIS
1,573,633
SPRING MOUNTING FOR MOTOR VEHICLES
Filed June 25, 1924
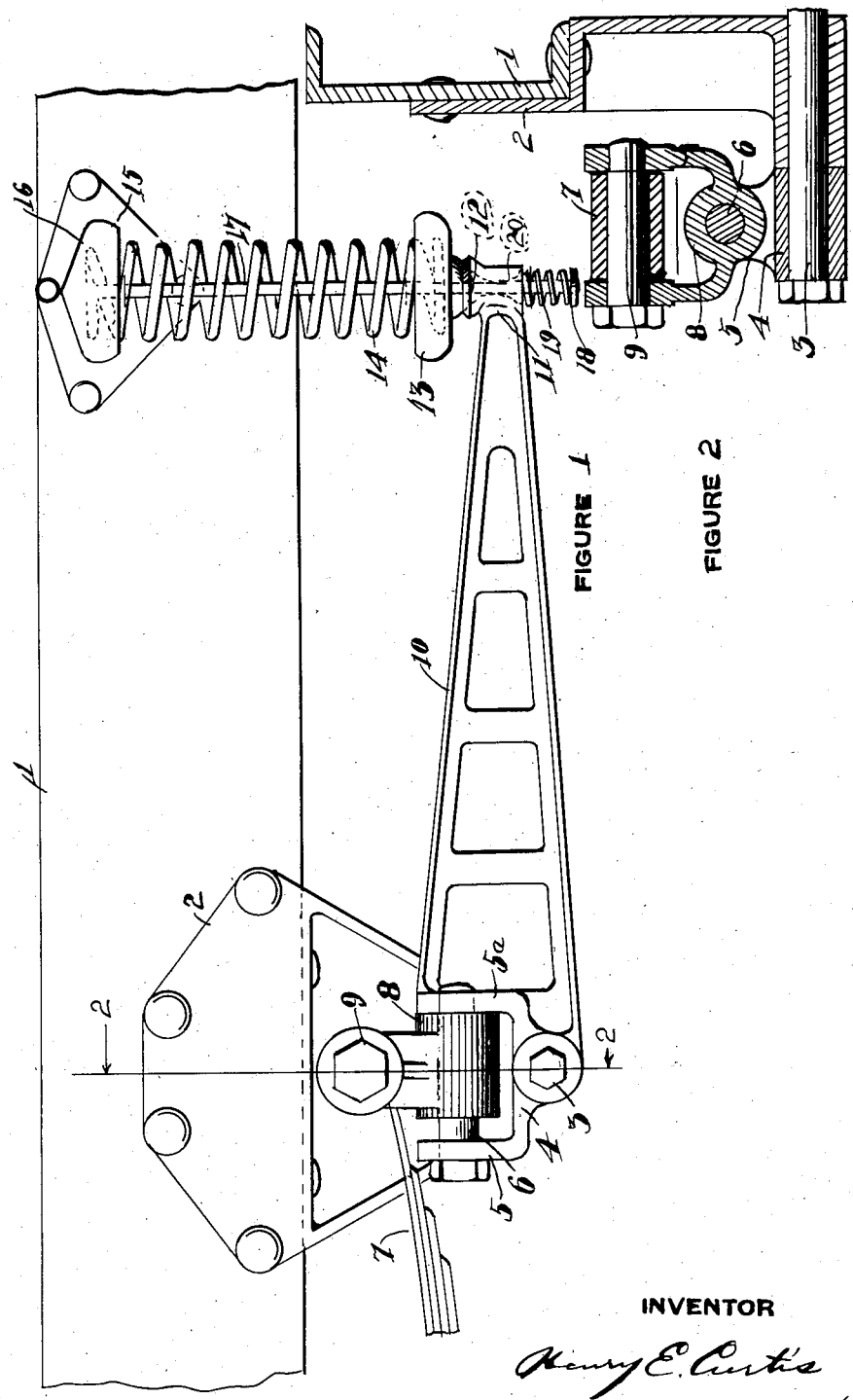
INVENTOR
Henry E. Curtis
BY John A. Naismith
ATTORNEY Patented Feb. 16, 1926.

1,573,633

UNITED STATES PATENT OFFICE.

HENRY E. CURTIS, OF SAN JOSE, CALIFORNIA, ASSIGNOR OF ONE-HALF TO JOHN H. BETTS, OF LONG BEACH, CALIFORNIA.

SPRING MOUNTING FOR MOTOR VEHICLES.

Application filed June 25, 1924. Serial No. 722,328.

*To all whom it may concern:*

Be it known that I, HENRY E. CURTIS, a citizen of the United States, and resident of San Jose, in the county of Santa Clara and State of California, have invented certain new and useful Improvements in Spring Mountings for Motor Vehicles, of which the following is a specification.

In motor vehicles designed to carry heavy loads, as in the case of a passenger vehicle, the live load may vary from zero to many thousand pounds. In the usual form of construction of the vehicle the supporting springs have practically free movement throughout the wide range of loads placed thereon, consequently when the vehicle is lightly loaded the springs do not provide the required resiliency, it being necessary to design the springs to properly carry capacity loads.

It is the object of the present invention to provide a means for mounting the vehicle frame upon the springs in such a manner as to automatically place the springs under a predetermined minimum load at all times without interfering with their freedom of action under greater loads, and utilizing their resiliency to the greatest advantage when under lighter loads.

It is a further object to provide a device of the character indicated that will permit a limited rocking movement of the motor frame without twisting the springs.

In the drawing;—

Figure 1 is a side elevation of the device.

Figure 2 is a section on line 2—2 of Figure 1.

Referring more particularly to the drawing, 1 indicates a part of a vehicle frame upon which is mounted a bracket 2 carrying a shaft 3 extending transversely of frame 1.

On shaft 3 is revolubly mounted a bearing member 4 carrying upwardly extending and spaced ears 5 and 5ª supporting a stub shaft 6 at right angles to shaft 3. These ears are so arranged that the ear 5 facing vehicle spring 7 is further from the vertical plane bisecting shaft 3 longitudinally than the ear 5ª.

On stub shaft 6 is slidably mounted a shackle 8 carrying a spring shackle bolt 9 at right angles to shaft 6 as shown, the spring 7 being mounted thereon.

The part 5ª of member 4 carries a lever arm 10 arranged in a vertical plane and tapering to a bearing portion 11 having a spherical bearing surface at 12 in which is seated a member 13 supporting the bottom end of a spring 14.

At 15 is shown a bracket mounted on frame 1 and provided with a seat 16 for the upper end of spring 14, a rod 17 being threaded into bracket 15 and passing through portion 11 of lever arm 10, and terminating in a nut 18, a snubber spring 19 being arranged thereon as shown.

In operation the action is as follows, assuming the device to be properly mounted on the rear ends of the rear springs of a passenger vehicle and arranged in parallel relation to each other, one on each side of the vehicle frame. When the vehicle is carrying a relatively heavy load the several parts are in the positions shown in the drawing, the flattening of spring 7 forcing shackle 8 along shaft 6 until it is centered over shaft 3. During all changing of the loading while the parts are in this position the device operates as though it were a fixed immovable part of the frame 1 supported on spring 7, because neither spring 14 or lever 10 is in action.

If, now, the live load is reduced beyond a certain point the relaxation of spring 7 causes shackle 8 to move along shaft 6 until it contacts with ear 5. Its movement being stopped at this point it tends to throw arm 10 upwardly because the shaft 3 now operates as a fulcrum about which element 4 pivots. This action is resisted, however, by spring 14 which acts on the long arm 10 to counterbalance the pull on short arm 5 by spring 7.

In this manner the spring 7 is sufficiently loaded at all times, even when carrying no live load, to give the maximum of efficient service.

The frame 1 and the parts rigidly attached thereto are permitted a slight rocking motion without twisting or even slightly deforming spring 7 by the pivotal mounting of shackle 8 on shaft 6 and by flaring the bearing 20 in part 11 through which rod 17 passes.

The snubber spring 19 arranged below end 11 of arm 10 assists in absorbing sudden shocks when the vehicle is lightly loaded as it acts in opposition to spring 14.

It is to be understood, of course, that changes in form, construction, and method of assembly and operation may be made within the scope of the appended claims.

I claim:

1. A spring mounting for vehicles comprising a lever fulcrumed upon the vehicle frame and slidably connected by its shorter arm to the vehicle spring, and a spring inserted between the vehicle frame and the longer arm of said lever.

2. A spring mounting for vehicles comprising a lever fulcrumed upon the vehicle frame, a shackle mounted thereon and slidable along the shorter arm of said lever to a neutral balanced position relative to the fulcrum, and resilient means inserted between said frame and the longer arm of said lever.

3. A spring mounting for vehicles comprising a lever fulcrumed upon the vehicle frame and connected by its shorter arm to the vehicle spring, a vertically disposed guide rod passing through an opening in the longer arm of said lever for longitudinal and rocking movements and rigidly mounted on said frame, and resilient connections between said longer arm and said rod and said frame.

4. A spring mounting for vehicles comprising in combination with the vehicle spring, a lever fulcrumed upon the vehicle frame and consisting of a cushioned long arm and a short arm embodying a part slidable lengthwise of the long arm, and means for connecting one end of the vehicle spring to said part.

5. A spring mounting for vehicles comprising in combination with the vehicle spring, a lever fulcrumed upon the vehicle frame and consisting of a cushioned long arm and a short arm consisting of spaced ears, a stub shaft supported in the ears transversely of the lever fulcrum and lengthwise of the long arm, and means connected to the vehicle spring and mounted on the stub shaft for limited movement.

6. A spring mounting for vehicles comprising in combination with the vehicle spring, a lever fulcrumed upon the vehicle frame and consisting of a cushioned long arm and a short arm consisting of spaced ears, a stub shaft supported in the ears transversely of the lever fulcrum and legthwise of the long arm, and a shackle slidable on the stub shaft and connected to the vehicle spring.

7. A spring mounting for vehicles comprising in combination with the vehicle spring, a lever fulcrumed upon the vehicle frame and consisting of a cushioned long arm and a short arm consisting of spaced ears, a stub shaft supported in the ears transversely of the lever fulcrum and lengthwise of the long arm, a shackle slidable on the stub shaft and having spaced ears to receive one end of the spring, and means connecting the spring to the latter ears.

8. In combination with a vehicle spring of the leaf type, an auxiliary cushioning means comprising a substantially bell-crank lever having one arm extending upwardly in spaced ears, means pivotally mounting the lever, means cushioning the other arm of the lever, a stub shaft carried by the ears and disposed lengthwise of the spring, a shackle slidable and rockable on the stub shaft, and means connecting the spring to the shackle.

9. In combination with a vehicle spring of the leaf type, a shackle connected to one end thereof, and cushioned means including a shaft on which the shackle is directly mounted for both lengthwise sliding and lateral rocking movements.

HENRY E. CURTIS.